United States Patent [19]

Wilson, Jr. et al.

[11] 4,148,546

[45] Apr. 10, 1979

[54] ELECTRICAL POWER DISTRIBUTION ASSEMBLY

[76] Inventors: Lester E. Wilson, Jr., Short St., Bedford, Mass. 01730; Stephen A. Machcinski, 228 Cottage Park Rd., Winthrop, Mass. 02152

[21] Appl. No.: 893,398

[22] Filed: Apr. 4, 1978

[51] Int. Cl.² .......................................... H01R 13/10
[52] U.S. Cl. ............................. 339/192 R; 339/198 C; 339/222
[58] Field of Search ........... 339/192, 193, 194, 198 C, 339/222, 19, 205

[56] References Cited

U.S. PATENT DOCUMENTS

| | | | |
|---|---|---|---|
| 1,950,717 | 3/1934 | Douglas | 339/198 C |
| 3,065,440 | 11/1962 | Bonwitt et al. | 339/19 |
| 3,275,765 | 9/1966 | Ferdon et al. | 339/19 |
| 3,937,551 | 2/1976 | Persson | 339/193 N |

Primary Examiner—Joseph H. McGlynn
Attorney, Agent, or Firm—Richard J. Birch

[57] ABSTRACT

An electrical power distribution assembly having over and under contacts is disclosed. In the preferred embodiment, the electrical power distribution assembly utilizes stacked upper and lower contact decks, each having two independent electrical circuits to provide a four circuit plug-in distribution assembly. Using modular components, the distribution assembly can be configured to provide switched and unswitched outputs as well as switched taps for the electrical power circuits.

2 Claims, 50 Drawing Figures

ELECTRICAL POWER DISTRIBUTION ASSEMBLY

BACKGROUND OF THE INVENTION

The present invention relates to electrical power distribution assemblies in general and, more particularly, to an electrical power distribution assembly having over and under electrical contacts.

The use of modular, removable wall panels, lighting components and other fixtures in offices and buildings is well known to those skilled in the art. Various plug-in assemblies, and cables have been suggested to minimize the amount of conventional hard wiring of electrical power, lighting and communication circuits in and between such wall panels, lighting components and fixtures.

It is a general objective of the present invention to provide an improved electrical power distribution assembly.

It is a specific objective of the invention to provide an electrical power distribution assembly that utilizes modular components to obtain a wide variety of circuit configurations.

It is another objective of the invention to provide maximum electrical contact density within the assembly while maintaining circuit integrity for a plurality of circuits.

It is a another feature of the invention that the electrical power distribution assembly maintains a given physical circuit contact location to provide a uniform system-wide circuit coding.

It is still another feature of the invention that the electrical power distribution assembly can accept an assembly of plug-in electrical connectors having a common electrical contact orientation while maintaining electrical separation of the distributed power circuits.

BRIEF DESCRIPTION OF THE INVENTION

The electrical power distribution assembly has a generally planar electrical contact deck and a plurality of electrical contacts mounted thereon in spaced relation on both the "upper" and "lower" surfaces of the deck. The electrical contacts wrap-around the edge of the deck from the upper surface to the lower surface and vice versa to provide "over" and "under" contacts.

A four circuit assembly is provided by assembling two electrical contact decks in superimposed relation with two electrical circuits on each deck. In this "quad" version, the ground and neutral circuits are on one deck, while the two power circuits are on the upper deck. This configuration is especially suited for power and lighting circuits in offices and other locations having modular and/or movable walls and lighting fixtures.

The above-listed objectives and features and other objectives and features of the invention will best be understood from a detailed description of a preferred embodiment of the invention selected for purposes of illustration and shown in the accompanying drawings, in which:

FIGS. 8A through 17A depict in plan view other configurations of the upper deck electrical contacts;

FIGS. 8B through 17B depict diagrammatically the electrical circuitry of the corresponding electrical contacts shown in FIGS. 8A through 17A;

FIGS. 18A through 22A illustrate in plan view various housing configurations for the electrical power distribution assembly;

FIGS. 18B through 22B depict the corresponding electrical contact decks for use with the housings shown in FIGS. 18A through 22A;

DETAILED DESCRIPTION OF A PREFERRED EMBODIMENT

Figure 2:
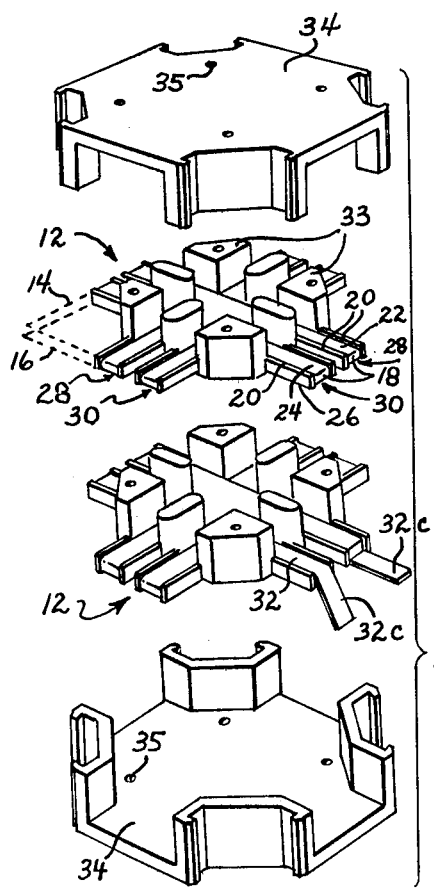
FIG. 2 is an exploded view in perspective of a two deck, four circuit version of the electrical power distribution assembly of the present invention showing the two electrical contact decks, two contacts positioned on the lower deck and the split housing shells.
Figure 1:
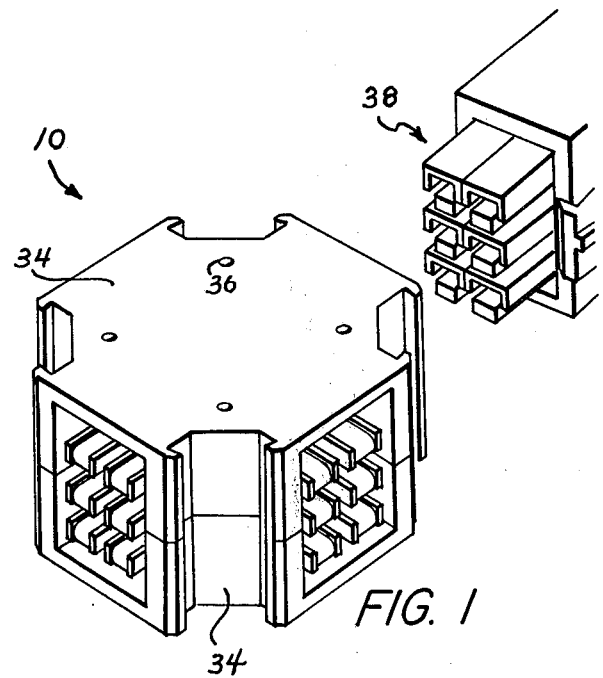
FIG. 1 is a view in perspective showing a three deck, six circuit version of the electrical power distribution assembly of the present invention and the associated six contact plug.

Turning now to the drawings and particularly to FIGS. 1 and 2 thereof, there is shown an electrical power distribution assembly constructed in accordance with the present invention and indicated generally by the reference numeral 10. The term "electrical power" as used therein refers to AC and DC and includes communication circuits with modulated carriers.

The major components of the electrical power distribution assembly 10 comprise one or more electrical contact decks 12 having generally planar upper and lower surfaces 14 and 16, respectively, and a peripheral edge 18. The upper surface has a plurality of ribs 20 that define at least two electrical contact channels 22 and 24 which extend from one peripheral edge location to at least one other peripheral edge location. Corresponding ribs 26 on the lower surface define congruent contact channels 28 and 30 which extend from one peripheral edge location to at least another location on the peripheral edge.

Figure 4:
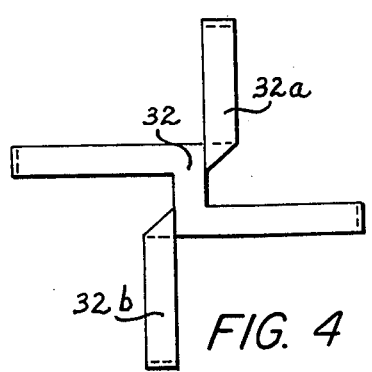
FIG. 4 is a plan view of another configuration of the electrical contact that is electrically the same as the contact shown in FIG. 3, but mechanically formed by folding two arms of the "H"-shaped stamped contact.
Figure 3:
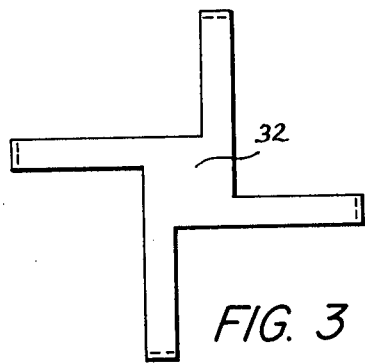
FIG. 3 is a plan view of one configuration of the electrical contact.

Each deck has one or more electrical contacts 32 positioned within the deck contact channels as shown in FIG. 2. The configuration of the FIG. 2 electrical contacts is illustrated in FIG. 3 and 4. Both Figures depict electrically identical contacts. The FIG. 3 contact is formed by stamping or cutting the contact from a sheet of electrically conductive material. This method of fabrication is wasteful of material. FIG. 4 shows a more economic way of producing the contact 32 by folding two arms 32a and 32b of an "H"-shaped contact.

Looking back at FIG. 2, it can be seen that each contact has a portion 32c that is folded around the peripheral edge of the deck and into the corresponding congruent contact channel. As viewed in FIG. 2, the lower surface contact is folded upwardly into the upper surface channel 20 while the upper surface contact is folded downwardly into the lower surface channel 30. This arrangement produces an over/under configuration for adjacent electrical contacts with the contacts vertically spaced apart.

Each deck has a plurality of upwardly extending spacers 33 that maintain the decks in spaced electrically separate, relationship when the decks are stacked together as shown in FIGS. 1 and 2. FIG. 1 illustrates a three deck, six input circuit arrangement while FIG. 2 illustrates a two deck, four input circuit configuration. The decks are formed, preferably by molding, from an electrically insulating material. Thermosettable or thermoplastic materials can be used as desired.

The deck or decks 12 are assembled in superimposed relation with identical housing shells 34 having rivet holes 35. The resulting assembly is secured together by suitable means such as by rivets 36. The assembled electrical power distribution assembly 10 can be plugged into a corresponding cable assembly indicated generally by the reference numeral 38 in FIG. 1. By way of illustration only, the cable assembly 38 terminates in a plurality of electrical connectors 40 of the type described in U.S. Pat. Nos. 3,218,599 and 3,259,870.

Figure 6:
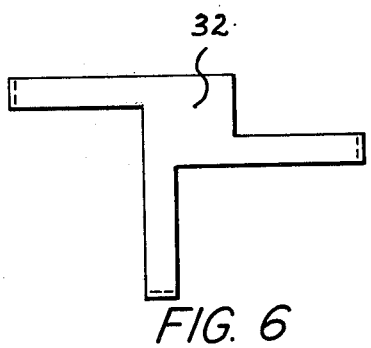
FIG. 6 depicts a three arm electrical contact in plan view.
Figure 5:
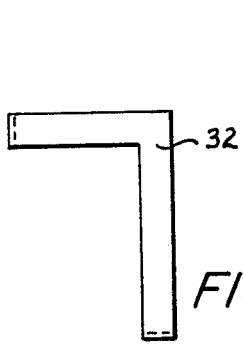
FIG. 5 illustrates in plan view an asymmetrical length "L"-shaped electrical contact.
Figure 21C:
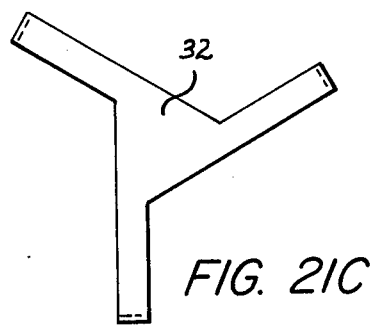
FIGS. 21C and 22C illustrate the electrical contacts for use in the contact decks of FIGS. 21B and 22B, respectively.
Figure 22C:
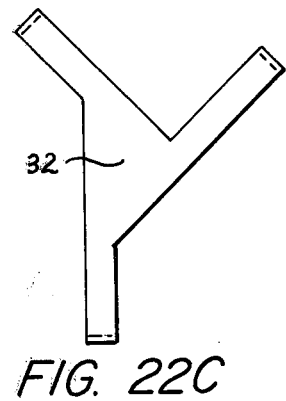

FIGS. 5 and 6 illustrate (together with FIGS. 3 and 4) electrical contacts that are employed to achieve the circuit variations shown in FIGS. 7 through 17. These Figures depict three and four circuit arrangements, using a pair of contact decks as shown in FIG. 2. The "upper" deck shown in plan view in FIGS. 7A through 17A contains the "power circuits," while the lower deck shown once in FIG. 7C contains the "ground" and "neutral" circuits. For ease of description, the two power circuits have been identified in the Figures as the "Red" and "Black" circuits 40 and 42. The ground and neutral circuits 44 and 46, respectively, are depicted only in FIG. 7C. However, these circuits on the "lower" contact deck are repeated for each of the circuit configurations shown in FIGS. 8A through 17A. It should be understood that the terms "upper" and "lower" are used only by way of illustration and both the decks and circuits can be reversed or the circuits can be varied on the two decks.

Figure 7A:
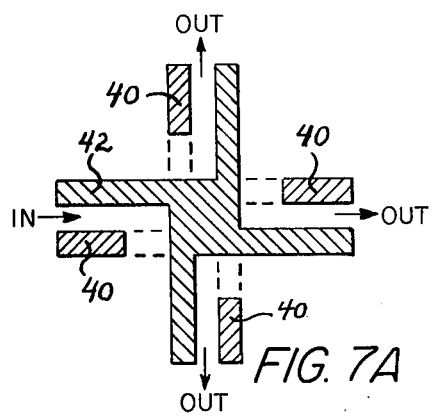
FIG. 7A illustrates in plan view the upper and lower electrical contacts on one of the contact decks.
Figure 7B:
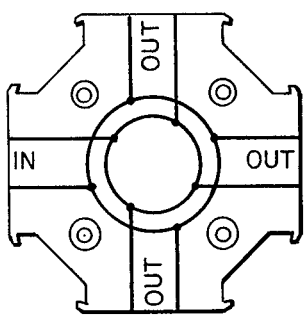
FIG. 7B illustrates diagrammatically the circuitry of the FIG. 7A contacts.
Figure 7C:
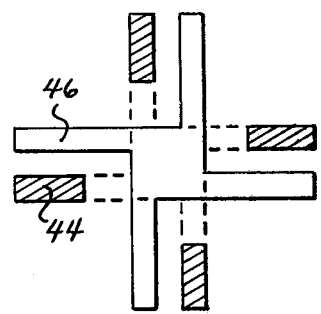
FIG. 7C illustrates in plan view the upper and lower contacts on the other of the contact decks.

Looking at FIGS. 7A and 7B, there is shown a three-way distribution of two circuits, "Red" and "Black" to three outputs. FIG. 7B illustrates diagrammatically the circuit of the FIG. 7A electrical contacts. The "Black" and "Red" circuit contacts are either a FIG. 3 or 4 contact.

Figure 8A:
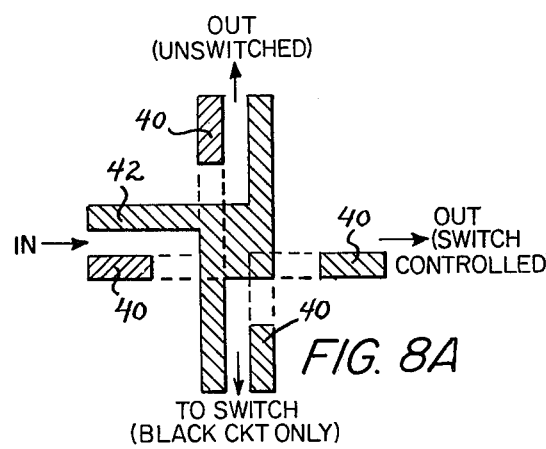
Figure 8B:
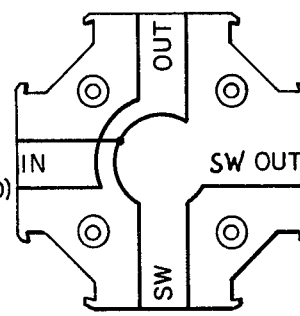

FIGS. 8A and 8B depict a switched "Black" circuit and an unswitched "Red" circuit. The "Black" circuit employs a FIG. 6 contact while the "Red" circuit uses a FIG. 5 "L"-shaped contact. The "Black" circuit also uses a symmetrical length "L"-shaped contact.

Figure 9A:
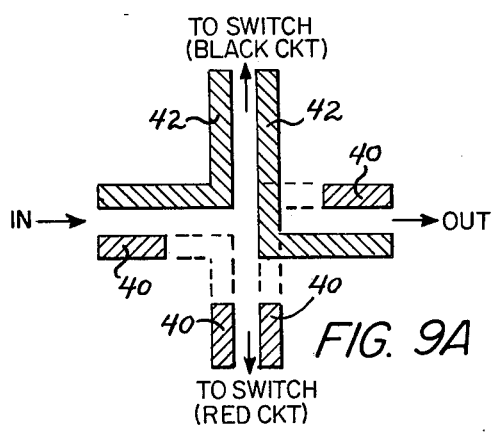
Figure 9B:
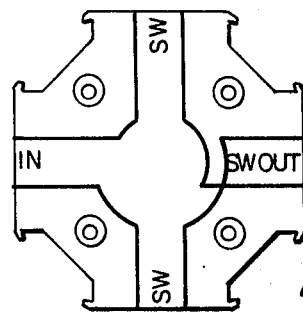

FIGS. 9A and 9B show switched "Black" and "Red" circuits using both symmetrical and asymmetrical "L"-shaped contacts.

Figure 10A:
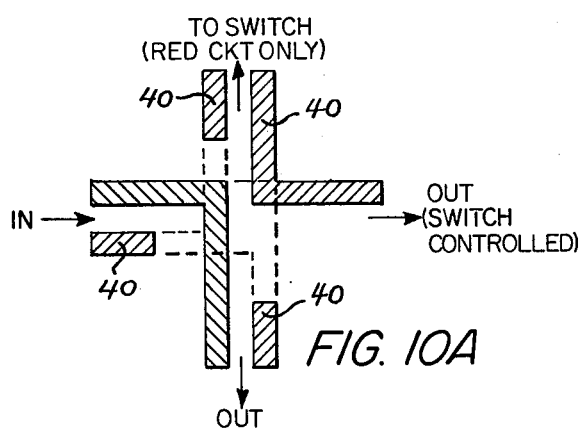
Figure 10B:
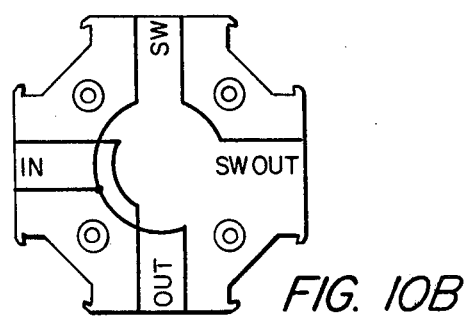
Figure 11A:
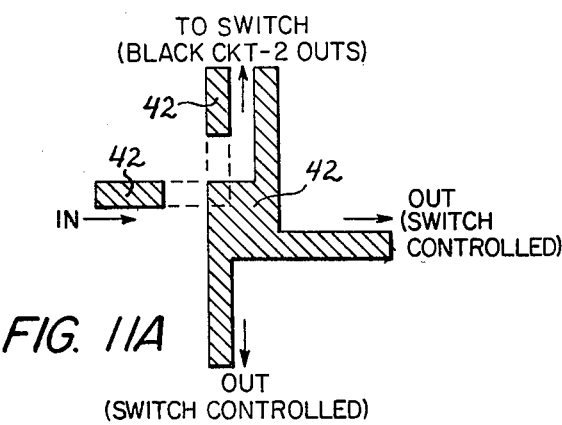
Figure 11B:
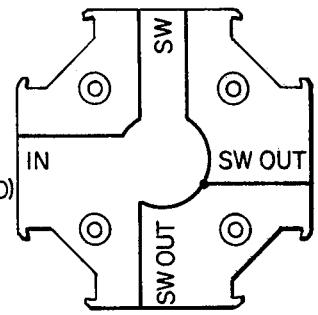
Figure 12A:
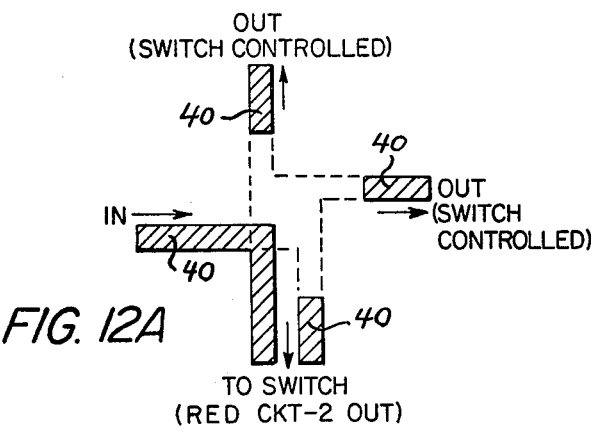
Figure 12B:
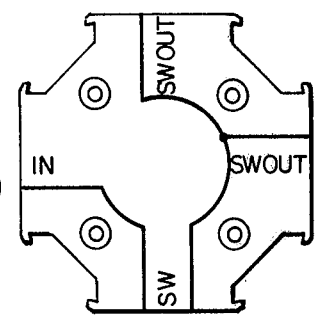

FIGS. 10A and 10B show a switched "Red" circuit and an unswitched "Black" circuit. The "Red" circuit uses a FIG. 6 contact and a symmetrical "L"-shaped contact while the "Black" circuit uses both symmetrical and asymmetrical "L"-shaped contact. Compare this circuit with the FIG. 8A-8B circuit.

FIGS. 11A-11B and 12A-12B depict, respectively, "Black" only two switched circuit outputs and "Red" only two switched circuit outputs. In each case, a FIG. 6 contact (flipped over) is used together with an a symmetrical "L"-shaped contact.

Figure 13A:
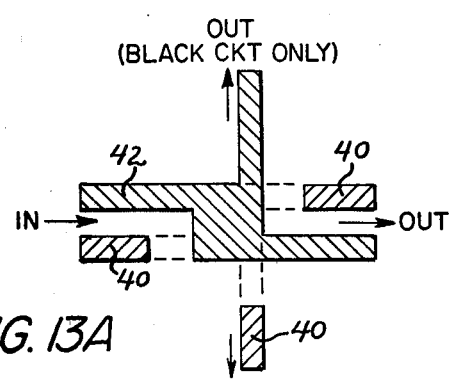
Figure 13B:
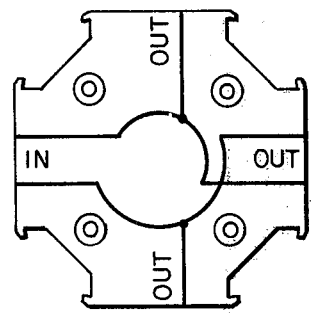

FIGS. 13A and 13B show a circuit configuration that provides a "Red" and "Black" output, a single "Red" output and a single "Black" output. The "Black" circuit uses a FIG. 6 contact while the "Red" circuit uses a flipped over FIG. 6 contact.

Figure 14A:
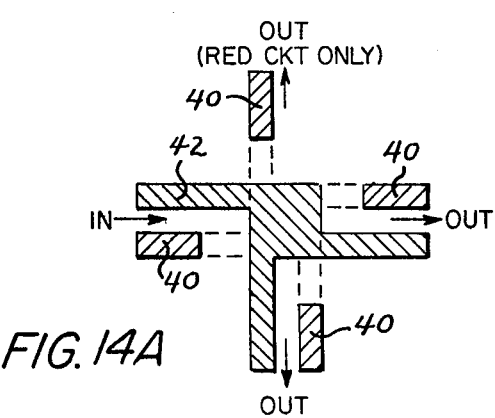
Figure 14B:
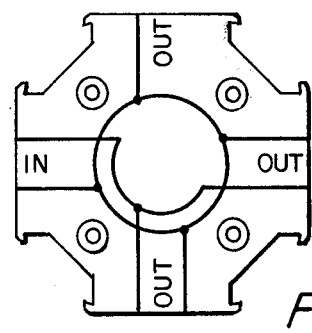
Figure 15A:
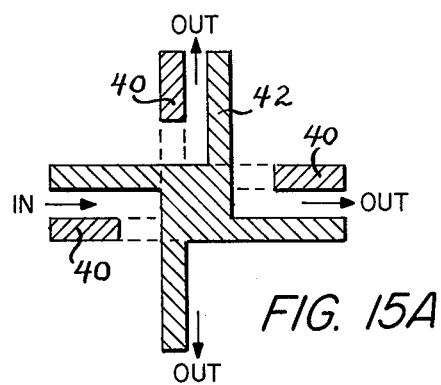
Figure 15B:
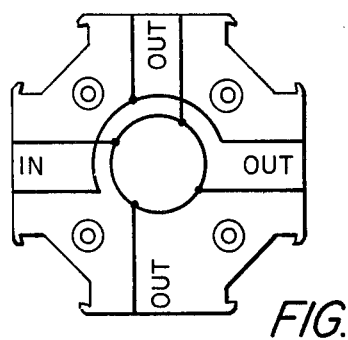
Figure 16A:
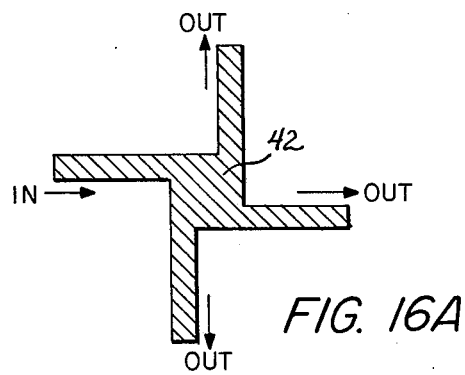
Figure 16B:
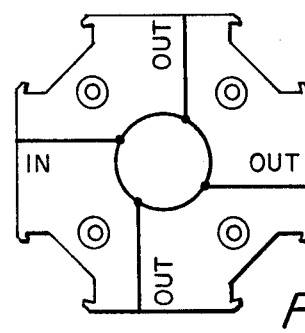
Figure 17A:
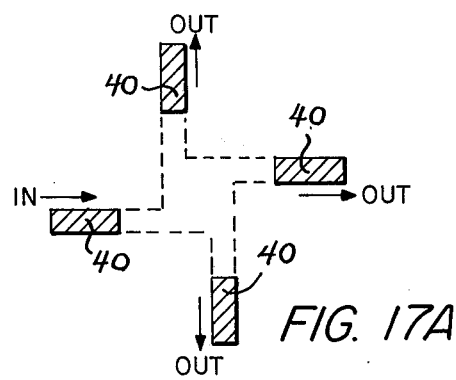
Figure 17B:
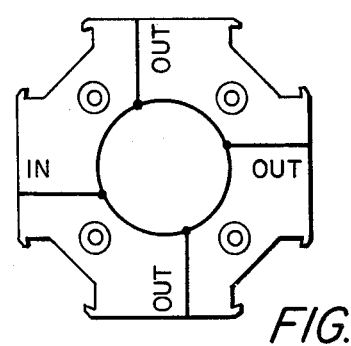
Figure 18A:
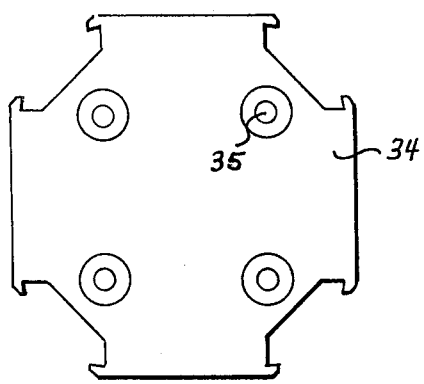

FIGS. 14A-14B and 15A-15B show, respectively, an arrangement for two "Red" and "Black" outputs and a single "Red" output (FIGS. 14A-14B) and two "Red" and "Black" outputs and a single "Black" output (FIGS. 15A-15B). FIG. 14A uses a "Black" FIG. 6 contact and a "Red" FIG. 3 or 4 contact. FIG. 15A employs a flipped over FIG. 6 contact for "Red" and a FIG. 3 or 4 contact for "Black".

FIGS. 16A-16b and 17A-17B illustrate, respectively, an all "Black" or an all "Red" circuit using either the FIG. 3 or FIG. 4 contact.

Figure 22A:
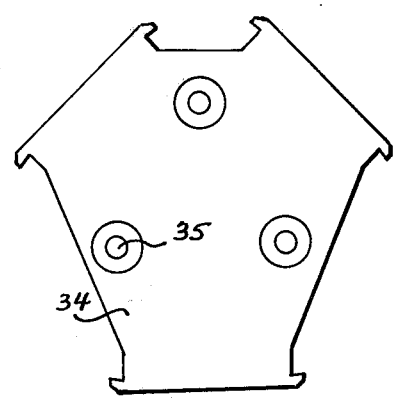
Figure 18B:
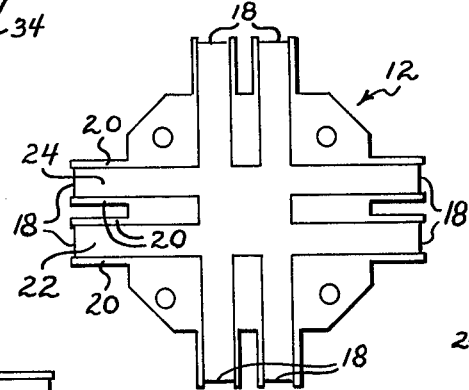
Figure 19B:
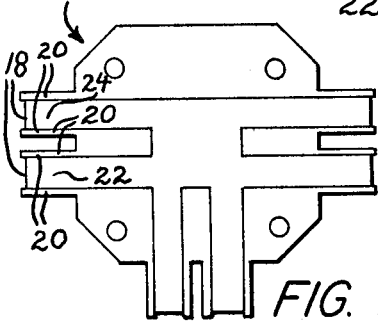
Figure 20B:
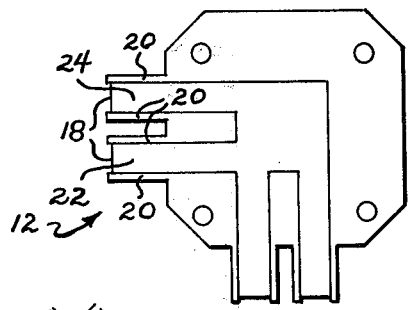
Figure 21B:
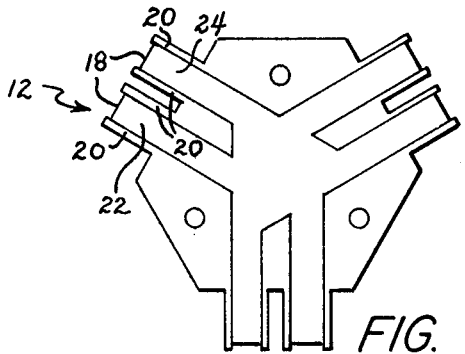
Figure 22B:
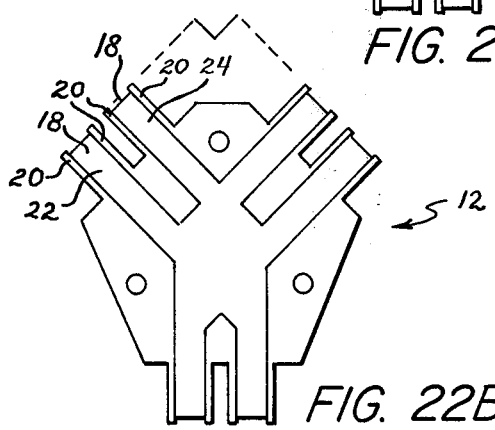

FIGS. 18A through 22A depict in plan view the housing shell configurations for: a single input and three outputs (FIG. 18A); one input and two outputs and a blank station (FIG. 19A); one input, one output and two blank stations (FIG. 20A); an equi-angular "Y" shaped, one input and two outputs (FIG. 21A) and the variation on the "Y" shape (FIG. 22A). The electrical connector decks for the FIG. 18A-22A housings are depicted in plan view in FIGS. 18B through 22B. The "Y"-shaped electrical contacts for the FIGS. 21 and 22 configurations are shown in FIGS. 21C and 22C, respectively.

Figure 20A:
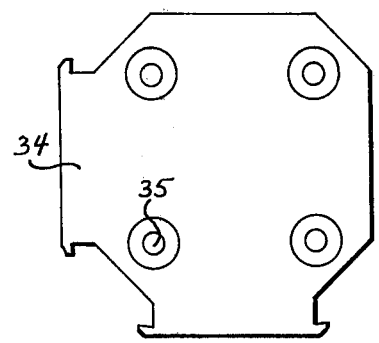
Figure 19A:
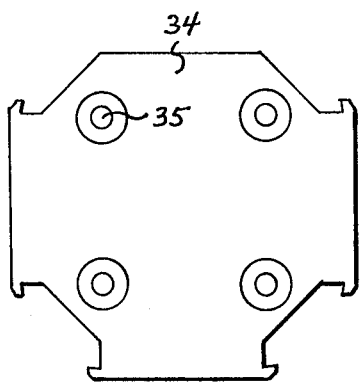
Figure 21A:
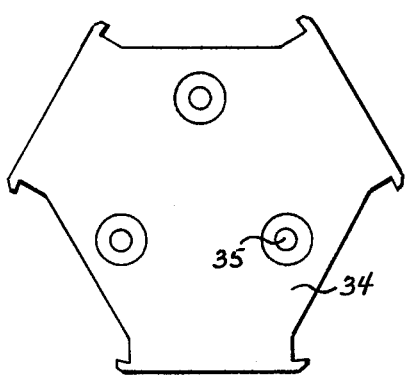
Figure 23:
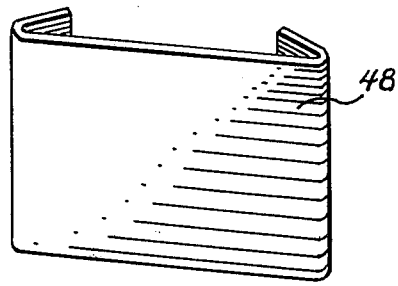
FIG. 23 illustrates in perspective view a snap fastening cap for covering one of the output contact assemblies shown in FIG. 1.

Although the use of blank stations is desirable, as shown in FIGS. 19A and 20A, this requires special housings. One can more easily cap off one of the stations on the quad housings of FIG. 18A by using a flexible, snap-on insulating cap 48 as shown in perspective view in FIG. 23.

Figure 24:
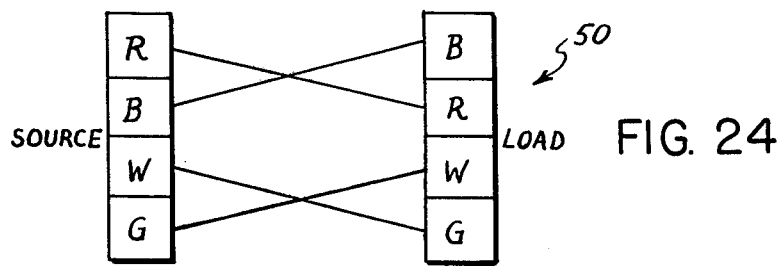
FIG. 24 illustrates diagrammatically a four circuit, ("Red", "Black", "White" neutral and "Green" ground) cable assembly with the "red" and "black" circuits reversed; and, FIGS. 25 through 31 depict other cable configurations with the White neutral and Green ground circuits omitted for purposes of clarity.

It has already been mentioned that the electrical power distribution assembly 10 can be part of a physically coded power disbribution system. Referring back to FIG. 7 through 17, it can be seen that the "Red" circuit is always on the right-hand side when looking into the power input of the assembly and when looking into the power output of the assembly (excluding outputs to switches). In order to maintain this coding from one distribution assembly to another, a reversing cable 50 shown diagrammatically in FIG. 24 is used. This cable reverses the physical positions of the "Red" and "Black" circuits. The corresponding "White" neutral and "Green" ground circuit physical positions are also reversed.

Figure 25:
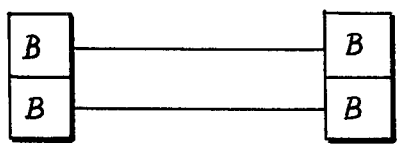
Figure 26:
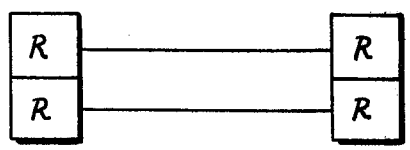
Figure 27:
Figure 28:

FIGS. 25 and 26 illustrate straight "Black" and "Red" circuit pairs for use in switching circuits. FIGS. 27 and 28 show single circuit "Red" and "Black" cables with physical reversal. The neutral and ground circuits have been omitted from FIGS. 25-28 for purposes of clarity.

Figure 29:
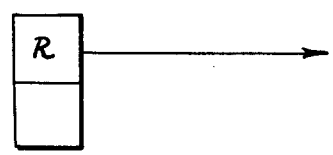
Figure 30:
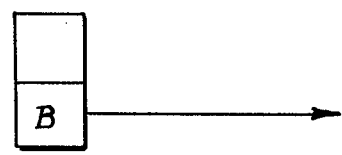
Figure 31:
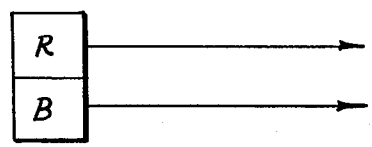

FIGS. 29-31 illustrate a single "Red" cable, a single "Black" cable and a dual cable for direct connection to a power consuming device; e.g., a lighting fixture. Again, the neutral and ground circuits have been omitted for purposes of clarity.

Having described in detail a preferred embodiment of our invention, it will now be apparent to those skilled in the art that numerous modifications can be made therein without departing from the scope of the invention as defined in the following claims.

What we claim and desire to secure by Letters Patent of the United States is:

1. An electrical power distribution assembly comprising:
   (1) a electrically insulating, electrical contact deck means having:
      (a) first and second, spaced generally planar surfaces;
      (b) means defining a peripheral edge between said surfaces;
      (c) means defining at least two electrical contact channels in the first surface and at least two congruent electrical contact channels in the second surface, said contact channels each extending from one location on the peripheral edge to at least one other location on the peripheral edge;
   (2) a first electrical contact positioned within one of said contact channels in the first surface and extending between said one peripheral edge location and the other location, said electrical contact having a portion thereof extending around the peripheral edge of the first deck means at each location and into the congruent channel in the second surface along only a portion thereof; and,
   (3) a second electrical contact positioned within the second surface channel that is congruent to the other of said first surface contact channels, said second electrical contact extending between said one peripheral edge location and the other location and having a portion thereof extending around the peripheral edge of the deck means at each location and into said other first surface channel along only a portion thereof.

2. An electrical power distribution assembly comprising:
   (1) a first electrically insulating, electrical contact deck means having:
      (a) first and second, spaced generally planar surfaces;
      (b) means defining a peripheral edge between said surfaces;
      (c) means defining at least two electrical contact channels in the first surface and at least two congruent electrical contact channels in the second surface, said contact channels each extending from one location on the peripheral edge to at least one other location on the peripheral edge;
      (d) a first electrical contact positioned within one of said contact channels in the first surface and extending between said one peripheral edge location and the other location, said electrical contact having a portion thereof extending around the peripheral edge of the first deck means at each location and into the congruent channel in the second surface along only a portion thereof;
      (e) a second electrical contact positioned within the second surface channel that is congruent to the other of said first surface contact channels, said second electrical contact extending between said one peripheral edge location and the other location and having a portion thereof extending around the peripheral edge of the deck means at each location and into said other first surface channel along only a portion thereof.
   (2) a second electrically insulating, electrical contact deck means having:
      (a) first and second, spaced generally planar surfaces;
      (b) means defining a peripheral edge between said surfaces;
      (c) means defining at least two electrical contact channels in the first surface and at least two congruent electrical contact channels in the second surface, said contact channels each extending from one location on the peripheral edge to at least one other location on the peripheral edge;
      (d) a first electrical contact positioned within one of said contact channels in the first surface and extending between said one peripheral edge location and the other location, said electrical contact having a portion thereof extending around the peripheral edge of the second deck means at each location and into the congruent channel in the second surface along only a portion thereof; and;
   (3) means for securing said first and second deck means in superimposed relation with the first deck means contact channels being congruent to the second deck means contact channels.

* * * * *